United States Patent

[11] 3,556,303

| [72] | Inventors | Max Diebold;<br>Eberhard Menge; Rudolf Hanschitz; Dieter<br>Weisshaar, Reichenbach, Germany |
| --- | --- | --- |
| [21] | Appl. No. | 863,623 |
| [22] | Filed | Oct. 3, 1969 |
| [45] | Patented | Jan. 19, 1971 |
| [73] | Assignee | Firma Electrostar GmbH<br>Reichenback(Fils), Germany |

[54] JUICE CENTRIFUGE ATTACHMENT FOR AN ELECTRIC KITCHEN APPLIANCE
11 Claims, 5 Drawing Figs.

[52] U.S. Cl. ............................ 210/377, 210/380
[51] Int. Cl. ............................ B01d 21/26
[50] Field of Search .................... 210/366, 377, 380

[56] References Cited
UNITED STATES PATENTS

| 2,304,929 | 12/1942 | Keith | 210/380X |
| 2,634,776 | 4/1953 | Kowan et al. | 210/380X |

*Primary Examiner*—J. L. Delesare
*Attorney*—McGlew and Toren

ABSTRACT: A juice centrifuge is composed of a container having an open upper end closed by a lid to which is secured a transmission housing which extends downwardly into the container. A transmission assembly is positioned within the housing and comprises a driving shaft which extends upwardly through the lid for operative engagement with a kitchen appliance and a driven shaft powered by the driving shaft. A screen drum is positioned within the container and is rotatably mounted on a hub removably secured on the lower end of the driven shaft. Juice discharge openings are provided from the screen drum below the point at which the transmission housing is detachably secured to the lid. A portion of the wall of the transmission housing forms a part of a filler shaft which extends downwardly from the lid to the lower end of the screen drum. A freewheeling gear drive is provided between the driving shaft and the driven shaft so that the screen drum can continue to rotate when the driving shaft is stopped to prevent any damage to the centrifuge.

JUICE CENTRIFUGE ATTACHMENT FOR AN ELECTRIC KITCHEN APPLIANCE

SUMMARY OF THE INVENTION

The present invention is directed to a juice centrifuge attachment for use with a kitchen appliance and, more particularly, it is directed to a compact arrangement of the juice centrifuge attachment which has a transmission assembly located within the juice centrifuge container.

Kitchen appliances are known which operate different accessories such as a juice centrifuge attachment. Further, centrifuges suitable for household use are known which are driven by their own permanently attached motor.

In the electric household appliance art, manually operated electric kitchen appliances are known which employ exchangeable drive systems.

The present invention provides an improvement over manually operated juice centrifuges in which a removable screen drum was mounted within the centrifuge container with the drive system for the screen drum extending upwardly above the lid of the container. Due to the arrangement of the drive system extending above the top of the container, there was always the danger that the centrifuge might tip over and the space required for the drive system was disproportionately great.

In the present invention, the problems experienced in prior art juice centrifuges is overcome by providing a centrifuge which is driven as an attachment for a hand-operated electric kitchen appliance. In this arrangement, the transmission or drive system for the screen drum of the centrifuge is positioned within the centrifuge container and only the driving shaft extends upwardly from the container for engagement with the kitchen appliance. As a result the height of the centrifuge is considerably reduced so that it can be easily attached to the kitchen appliance. The driven system or transmission assembly is positioned within a transmission housing centrally positioned within the screen drum so that it does not provide any obstacle or interference with the operation of the centrifuge. During operation the central portion of the screen drum in a centrifuge always remains free of the material being processed and, accordingly, an efficient operating arrangement is achieved. Further, it is possible to provide a simple arrangement of the driving shaft extending upwardly through the lid of the centrifuge container so that it can be secured into an electrically driven kitchen appliance in a known manner.

Preferably, the transmission housing and assembly is designed as a separate component and is detachably connected to the lid, such as by means of threaded screws or bolts. Due to this arrangement it is not only easier to form the various components, but it is easier to service and maintain the transmission or drive system arrangement. To seal the transmission housing effectively, it is connected to the lid at a location spaced above the juice discharge openings from the screen drum within which the housing is located so that there is no danger of juice entering the housing and a relatively simple sealing device can be employed. Another novel characteristic of the present invention is the arrangement of the shaft for charging material into the centrifuge. A portion of the wall of the transmission housing provides a part of the shaft passing through the screen drum. For charging material into the shaft, a funnel is provided in the lid which is aligned with the shaft when the transmission housing is secured in position to the lid.

When the juice centrifuge container is provided with a pouring spout extending outwardly from its periphery it is advantageous for the lid to provide an extension forming a cover for the spout. The spout cover formed on the lid serves several purposes:

1. It provides an indexing member for preferably positioning the lid on the container;

2. It prevents juice from splattering out of the container; and

3. It serves to position the lid in the radial direction.

It previous centrifuge arrangements, the screen drum has been fastened to the drive shaft of the transmission assembly by means of a screw. Such a connection is very disadvantageous when it is necessary to remove the screen drum for emptying its contents.

To overcome this disadvantageous connection arrangement, in the present invention the screen drum has a centrally arranged hub in its lower surface which extends downwardly into the container and the hub contains a spring-loaded pawl positioned within a cross slot in the hub and engageable within an annular groove in the lower conically shaped end of the driven shaft of the transmission assembly. When the screen drum is being fitted to the end of the driven shaft, the spring-loaded pawl snaps into the annular groove automatically due to the conical arrangement of the end of the shaft. When the screen drum is to be disengaged, it is only necessary to displace the pawl to remove the drum from the end of the driven shaft.

Most manually operated electric appliances use a worm wheel drive which results in a self-braking action when the rotation of the driving shaft is stopped. In a juice centrifuge the screen drum along with its contents represents a considerable centrifugal mass when it is rotating and when the power is cut off to the driving shaft a sudden load would be applied to the worm wheel drive which could easily result in damaging or destroying the drive.

To assure continued operation of the juice centrifuge in the present invention without fear of damage to the drive system, a freewheeling arrangement is provided between the driving and the driven shafts of the transmission assembly. In one particularly simple embodiment of the freewheeling arrangement, a gear member of the transmission assembly is connected to the driving shaft by means of a helical or spiral spring which serves as a clutch. Preferably, the spring is connected to the driving shaft by means of a sleeve and the diameter of this sleeve corresponds approximately to the diameter of the gear hub with the spring extending from the sleeve downwardly about the gear hub for at least a portion of its length. In this arrangement, an improved connection is provided between the spring and the shaft on one hand and the gear on the other, and, further, any detachment of the components is prevented.

To provide an improved support for the centrifuge against possible tipping, the centrifuge container is provided with supporting feet with one of the feet located opposite the charging funnel in the lid and a second foot being located under the position of the electric appliance to which the driving shaft is attached. In this manner support is provided for the centrifuge in the locations where weight or pressure might be a contributing factor in tipping the device. Moreover, to further improve the stability of the centrifuge the proportion of the height of the juice container along with its lid to the diameter of the container is selected in the range between 1:1.1 to 1:1.5, and in particularly, in the ratio of 1:1.35. For effecting a uniform distribution of the material to be processed along the height of the screen drum, a rib is provided inside the screen drum which extends from a point near its center in a radially outward and upward arrangement in the rotational direction of the drum. In a preferred arrangement of the invention, the rib is secured to and extends outwardly from the charging shaft. In the drive system of the centrifuge the driving and the driven shafts are mounted at their upper ends in the lid and at their lower ends in the transmission housing. It is important that the bearings holding the shafts should not leak and, at the same time, that the shafts should not be twisted during operation. To meet these conditions, the shaft bearings are formed of bushings with a pair of diametrically arranged radially extending noses which extend outwardly into sleeve extensions of the transmission housing and of the lid which are equipped with matching slots. This arrangement makes it possible to provide a relatively small clearance between the bushing and the shaft because a certain clearance can be provided between the bushing and the sleeve extensions. The sealing effect remains the same because a kind of labyrinth seal has been provided by this arrangement.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
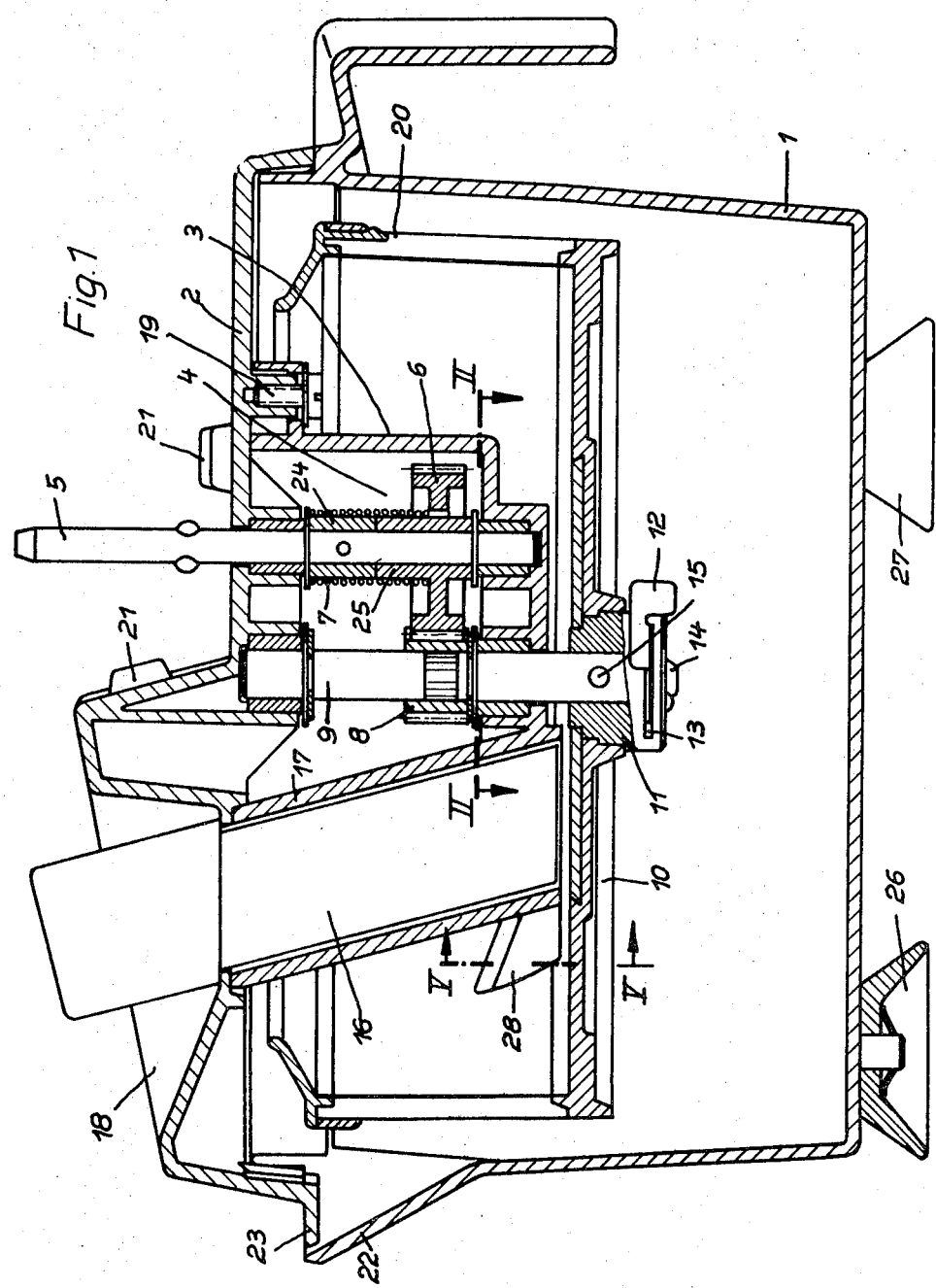
FIG. 1 is a vertical sectional view through a juice centrifuge embodying the present invention.

In FIG. 1, a juice centrifuge is shown comprised of a juice container 1 open at its upper end and closed by a lid 2. Secured to the interior of the lid extending downwardly into the container is a transmission housing 3 containing a drive system or transmission assembly 4.

The transmission assembly is formed of an upwardly extending driving shaft which is arranged to rotate freely, being held at its lower end in the housing and extending through the lid 2 to a point located upwardly above the lid. Mounted on the driving shaft 5 near its lower end is a gear member 6 which is arranged to transmit the rotation of the shaft 5 through a pinion 8 to a driven shaft 9 spaced laterally from the driving shaft. A cylindrically shaped spiral spring 7 serves as a clutch for connecting the gear member 6 to the shaft 5 so that a freewheeling arrangement of the gear member is provided.

In effecting the freewheeling arrangement of the gear member a sleeve 24 is positioned on the driving shaft 5 and extends downwardly into contact at its lower end with a hub 25 extending upwardly from the gear member 6. The outside diameter of the sleeve and the hub are approximately the same. The spring 7 encircles the sleeve 24 and extends downwardly therefrom also encircling at least a part of the gear hub 25.

In most manually operated electrical appliances, a worm drive transmission is employed which effects a self-braking action when the rotation of the driving shaft is shut off. In a juice centrifuge this shut down would result in a sudden stopping of the screen drum and its contents which due to its considerable centrifugal mass would tend to continue to rotate and would tend to damage the conventional-type transmission setup. By providing a freewheeling arrangement for the gear member when the driving shaft is stopped the driven shaft can continue to rotate preventing the damage which might otherwise occur.

The driven shaft is secured at its upper end within the lid 2 and extends downwardly through the housing 3 to a point located below it. At the lower end of the driving shaft a screen drum 10 is mounted on a hub 11 which in turn is secured to the shaft by means of a spring-loaded pawl 12. The hub 11 extends downwardly below the screen drum 10 and the spring loaded pawl 12 is secured to its lower end. At its lower end 14 the driven shaft 9 has a frustoconical shape and is provided with an annular groove which is not visible in the drawing. The spring-loaded pawl 12 is pivoted to the hub and fits within a slot 13, in the assembled position the pawl 12 fits into the annular groove in the driven shaft for securing the screen drum to the shaft in an easily detachable manner. In its assembled position on the shaft, the screen drum is engaged by a cross pin 15 in the driven shaft, the cross pin engages a longitudinal groove in the hub which is not seen in the drawing.

For charging material into the screen drum, a charging shaft 16 extends downwardly from the lid into the lower end of the drum. A section 17 of the wall of the transmission housing 3 cooperates to form a part of the charging shaft 16.

At its upper end, the charging shaft 16 is aligned below the opening of a charging funnel 18 formed in the upper surface of the lid 2.

The screen drum 10, which is located in the upper portion of the container 1, has juice discharge openings 20 formed in its lateral surface with the upper ends of its openings spaced below the lid. The transmission housing 3 is secured to the lid by a number of threaded bolt members 19. The locations of the connections of the transmission housing to the lid are positioned above the juice discharge openings 20 from the screen drum and, as a result, no juice can penetrate through the connection into the housing. Due to the location and arrangement of the connection between the transmission housing and the lid, a relatively simple seal is all that is required for the transmission housing. Additionally, the wall section 17 separates the charging shaft 16 from the interior of the transmission housing so that no seal is required for this portion of the device.

On the upper surface of the lid 2 a number of shoulders 21 are provided about the driving shaft 5 for serving as seats for the electrical appliance into which the shaft 5 is inserted for driving the screen drum. Since such electrical appliances are well known in the art, it is not considered necessary to illustrate the appliance in the drawing.

Adjacent its upper edge the juice container 1 is equipped with a pouring spout 22 and the spout is covered or closed by an extension 23 formed on the radially outer edge of the lid 2. With the extension 23 closing the spout 22, juice is prevented from splattering out of the container and, in addition, the extension also serves to index the position of the lid on the container and also provides a radial stop for the lid relative to the container.

The juice container 2 is provided with a number of supporting feet and two of these feet 26, 27 are positioned to assure the stability of the container. One of the supporting feet 26 is aligned below the charging funnel 18 in the lid and another support foot 27 is positioned below the location at which the driving shaft 5 is secured into the electric appliance which provides its driving action. The location of these particular supporting feet 26, 27 provides an advantageous supporting arrangement for protecting against tipping of the container.

Figure 5:
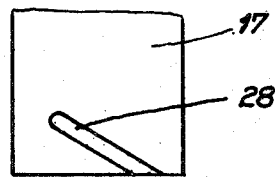
FIG. 5 is a view taken along line V-V in FIG. 1.

As indicated in FIGS. 1 and 5, a fixed rib 28 is secured within the screen drum 10 to the lower end of the filler shaft 16. The fixed rib 28 extends radially outwardly and obliquely upwardly from the filler shaft in the rotational direction of the drum. This arrangement of the rib distributes the material to be processed in a uniform manner over the height of the drum 10.

Figure 2:
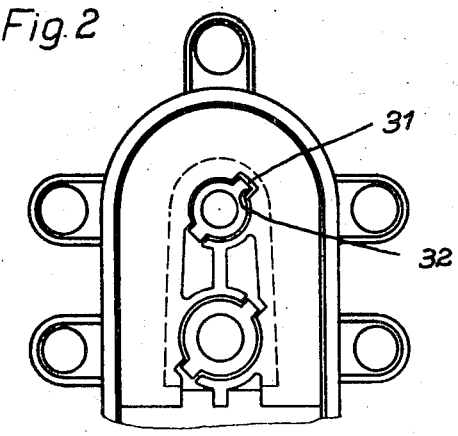
FIG. 2 is a view taken along line II-II in FIG. 1.
Figure 3:
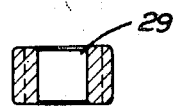
FIG. 3 is a vertical sectional view of a bearing bushing as employed in FIG. 2.
Figure 4:
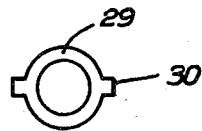
FIG. 4 is a top view of the bearing bushing shown in FIG. 3.

To prevent a twisting or torsion action on the driving and driven shafts 5 and 9, while holding them securely in position at their bearing points, the shafts are secured at their bearing points within the transmission housing and the lid in bushings 29, as shown in FIGS. 3 and 4. The bushings 29 are each provided with radially outwardly extending projections 30 located on diametrically opposite sides of the bushings. In FIG. 2 the arrangement of the bushings within the lid 2 and transmission housing 3 is shown wherein slots 31 in sleeve extensions 32 are provided for receiving the projections 30 on the bushings.

In providing the desired stability for the juice centrifuge the dimensions of the container play an important role, preferably the ratio of the height of the juice container with its lid to its diameter is in the range of 1:1.1 to 1:1.5 and in particular, in the ratio of 1:1.35.

We claim:

1. A juice centrifuge, comprising a container having an open upper end, a lid for closing the upper end of said container, a transmission assembly removably secured to said lid, said transmission assembly comprising a driving shaft having its lower end located within said container and extending upwardly therefrom through said lid so that a portion of said driving shaft extends above said lid and is arranged to be driven by an electrical appliance, a housing removably secured to said lid and extending downwardly therefrom into said container, said driving shaft being rotatably fitted into said housing at its lower end and extending upwardly therethrough, a driven shaft positioned within said housing and spaced laterally from said driving shaft, gear means disposed within said housing for transmitting the rotational action of said driving shaft to said driven shaft, and a screen drum positioned within said container and mounted on said transmission assembly to be rotated thereby.

2. A juice centrifuge, as set forth in claim 1, said gear means comprising a gear member mounted on said driving shaft, and means for coupling said gear member to said driving shaft for rotating said gear member by means of said driving shaft and for permitting freewheeling of said gear member when said driving shaft is stopped.

3. A juice centrifuge, as set forth in claim 2, said means for coupling said gear member to said driving shaft comprising a sleeve connected to said driving shaft, a hub extending from said gear member and disposed concentrically about said driving shaft, one end of said sleeve being contiguous to the end of said hub, said sleeve and said hub having approximately the same exterior diameter, and a spiral-type spring member disposed about said sleeve and extending therefrom and extending about at least a portion of said hub for interconnecting the driving action of said driving shaft through said sleeve and spring to said hub and gear member.

4. A juice centrifuge, as set forth in claim 2, wherein said driven shaft extends downwardly through said transmission housing having its lower end located below said transmission housing, and means for rotatably securing said screen drum to the lower end of said driven shaft below said housing.

5. A juice centrifuge, as set forth in claim 4, said means for connecting said screen drum to said driven shaft comprising a hub mounted centrally within the lower surface of said screen drum, a spring-loaded pawl member pivoted to said hub, said hub having a slot therein for receiving said pawl, said driven shaft having an annular slot in its lower end arranged to receive said pawl when said hub of said screen drum is fitted to the lower end of said driven shaft, and a pin extending outwardly from said driven shaft at a position above said annular groove therein for engagement within a groove in said hub for rotating said hub and said screen drum.

6. A juice centrifuge, as set forth in claim 1, a charging shaft being positioned within said screen drum extending downwardly therethrough and having its upper end adjacent said lid and its lower end adjacent the bottom of said screen drum, a wall section of said transmission housing forming a part of said charging shaft.

7. A juice centrifuge, as set forth in claim 6, said lid being configured to form a downwardly converging charging funnel having an opening at is lower end aligned above the upper end of said charging shaft for charging materials into said screen drum.

8. A juice centrifuge, as set forth in claim 7, a plurality of supporting feet being secured to the lower surface of said container, one of said support feet being attached to said container at a position aligned below said charging funnel, and a second one of said supporting feet being attached to said container at a position aligned below the location on the lid of said container arranged to receive the electrical appliance for driving said driving shaft, whereby the location of said supporting feet provide improved stability for said container against tipping.

9. A juice centrifuge, as set forth in claim 6, a distributing rib secured to the lower end of said charging shaft for uniformly distributing material in said screen drum, said distributing rib extending radially outwardly from and having its upper surface extending angularly upwardly from said charging shaft.

10. A juice centrifuge, as set forth in claim 1, a plurality of projections extending outwardly from the upper surface of said lid and being arranged about said driving shaft for acting as seats for the electrical appliance used for driving said driving shaft.

11. A juice centrifuge, as set forth in claim 1, wherein bearing means are arranged for rotatably supporting said driving shaft and said driven shaft within said lid and said transmission housing, said bearing means comprising bushings mounted on said shafts, each of said bushings having having a pair of diametrically disposed outwardly extension extending projections on the outer surfaces of said bushings, and sleeves disposed in said lid and said transmission housing having slots for receiving said projections on said bushings for permitting movement of said driving and driven shafts without any twisting action.